(12) United States Patent
Holm et al.

(10) Patent No.: US 12,333,626 B2
(45) Date of Patent: Jun. 17, 2025

(54) PROCESSOR, METHOD AND NON-TRANSITORY COMPUTER-READABLE STORAGE MEDIA FOR HANDLING DATA

(71) Applicant: Arm Limited, Cambridge (GB)

(72) Inventors: Rune Holm, Oslo (NO); Elliot Maurice Simon Rosemarine, London (GB)

(73) Assignee: Arm Limited, Cambridge (GB)

( * ) Notice: Subject to any disclaimer, the term of this patent is extended or adjusted under 35 U.S.C. 154(b) by 287 days.

(21) Appl. No.: 18/184,212

(22) Filed: Mar. 15, 2023

(65) Prior Publication Data

US 2024/0311947 A1   Sep. 19, 2024

(51) Int. Cl.
  *G06T 1/20*   (2006.01)
  *G06T 1/60*   (2006.01)

(52) U.S. Cl.
  CPC . *G06T 1/20* (2013.01); *G06T 1/60* (2013.01)

(58) Field of Classification Search
  CPC .................................. G06T 1/20; G06T 1/60
  See application file for complete search history.

(56) References Cited

U.S. PATENT DOCUMENTS

| | | | | |
|---|---|---|---|---|
| 2020/0310400 A1* | 10/2020 | Jha | ...................... | G05B 23/0254 |
| 2021/0150230 A1* | 5/2021 | Smolyanskiy | ......... | G06V 10/82 |
| 2022/0058774 A1* | 2/2022 | Zhu | ............................ | G06T 5/00 |
| 2023/0008622 A1* | 1/2023 | Boyd | ...................... | G06N 3/063 |
| 2023/0129845 A1* | 4/2023 | Bahk | ...................... | G06N 3/045 |
| | | | | 706/27 |

* cited by examiner

*Primary Examiner* — Xin Sheng

(74) *Attorney, Agent, or Firm* — EIP US LLP

(57) ABSTRACT

A processor, method and non-transitory computer-readable storage medium for handling data, by obtaining task data describing a task to be executed in the form of a plurality of operations on data, the task data further defining an operation space of said data, analyzing each of the operations to define transformation data comprising transformation instruction representing a transform into an associated operation-specific local spaces. In case transformation instructions to get to the operation-specific local space for an operation are producing less dimensions compared to the operation space, one or more operation-specific arguments are stored in a data field corresponding to a dimension not produced by the transformation instructions in the transformation data corresponding to the operation.

20 Claims, 5 Drawing Sheets

400

| Dimension | Transform | Description |
|---|---|---|
| d1 | F1(d0-d7) | - |
| d2 | F2(d0-d7) | - |
| d3 | F3(d0-d7) | - |
| d4 | F4(d0-d7) | - |
| d5 | F5(d0-d7) | - |
| d6 | F6(d0-d7) | - |
| d7 | F7(d0-d7) | - |
| d8 | F8(d0-d7) | - |

| Dimension | Transform | Description |
|---|---|---|
| d1 | Return n; | Batch |
| d2 | Return oy | Output y |
| d3 | Return ox | Output x |
| d4 | Return c | Channel |
| d5 | F1(oy) | Input y |
| d6 | F2(F1(oy)) | Input y remainder |
| d7 | F3(ox) | Input x |
| d8 | F4(F3(ox)) | Input x remainder |

PROCESSOR, METHOD AND NON-TRANSITORY COMPUTER-READABLE STORAGE MEDIA FOR HANDLING DATA

BACKGROUND OF THE INVENTION

Field of the Invention

The present invention relates to methods, processors, and non-transitory computer-readable storage media for handling data for processing by a plurality of operations, such as neural network processing operations and graphics processing operations.

Description of the Related Technology

Certain data processing techniques, such as neural network processing a graphics processing, involve the processing and generation of considerable amounts of data using operations. It is desirable to efficiently handle the data when processing by a plurality of operations.

SUMMARY

A processor for handling data, the processor comprising a handling unit, a plurality of storage elements, and a plurality of execution units, the processor configured to: obtain, from storage, task data describing a task to be executed in the form of a plurality of operations on data, wherein each of the operations maps to a corresponding execution unit of the processor, the task data further defining an operation space of said data, the operation space representing dimensions of a N-dimensional arrangement of the operations to be executed, wherein N>1; wherein the handling unit is configured to, for each of a plurality of N dimensional portions of the operation space: define transformation data comprising transformation instructions representing a transform of the N dimensional portion of the operation space to generate respective operation-specific local spaces for each of the plurality of the operations, wherein said transformation data comprising a data field corresponding to each of the N dimensions of the operation space; for at least one operation of the plurality of operations, upon transformation from the operation space to the operation-specific local space requiring transformation instructions producing M dimensions, wherein M<N, define one or more operation-specific arguments, and store said one or more operation-specific arguments in a data field of corresponding to a dimension not produced by the transformation instructions in the transformation data; and dispatch, to each of a plurality of the execution units associated with operations for which transformed local spaces have been generated, invocation data including said transformation data.

According to a second aspect of the present invention, there is provided a method for handling data in a processor comprising a handling unit, a plurality of storage elements, and a plurality of execution units, the method comprising: obtaining, from storage, task data describing a task to be executed in the form of a plurality of operations on data, wherein each of the operations maps to a corresponding execution unit of the processor, the task data further defining an operation space of said data, the operation space representing dimensions of a N-dimensional arrangement of the operations to be executed, wherein N>1; for each of a plurality of N dimensional portions of the operation space: defining transformation data comprising transformation instructions representing a transform of the N dimensional portion of the operation space to generate respective operation-specific local spaces for each of the plurality of the operations, wherein said transformation data comprising a data field corresponding to each of the N dimensions of the operation space; for at least one operation of the plurality of operations, upon transformation from the operation space to the operation-specific local space requiring transformation instructions producing M dimensions, wherein M<N, defining one or more operation-specific arguments, and storing said one or more operation-specific arguments in a data field of corresponding to a dimension not produced by the transformation instructions in the transformation data; dispatching, to each of a plurality of the execution units associated with operations for which transformed local spaces have been generated, invocation data including said transformation data.

According to a third aspect of the present invention there is provided a non-transitory computer-readable storage medium comprising a set of computer-readable instructions stored thereon which, when executed by at least one processor comprising a handling unit, a plurality of storage elements, and a plurality of execution units, the instructions are arranged to cause the at least one processor to: obtaining, from storage, task data describing a task to be executed in the form of a plurality of operations on data, wherein each of the operations maps to a corresponding execution unit of the processor, the task data further defining an operation space of said data, the operation space representing dimensions of a N-dimensional arrangement of the operations to be executed, wherein N>1; for each of a plurality of N dimensional portions of the operation space: defining transformation data comprising transformation instructions representing a transform of the N dimensional portion of the operation space to generate respective operation-specific local spaces for each of the plurality of the operations, wherein said transformation data comprising a data field corresponding to each of the N dimensions of the operation space; for at least one operation of the plurality of operations, upon transformation from the operation space to the operation-specific local space requiring transformation instructions producing M dimensions, wherein M<N, defining one or more operation-specific arguments, and storing said one or more operation-specific arguments in a data field of corresponding to a dimension not produced by the transformation instructions in the transformation data; dispatching, to each of a plurality of the execution units associated with operations for which transformed local spaces have been generated, invocation data including said transformation data.

BRIEF DESCRIPTION OF THE DRAWINGS

Further features and advantages will become apparent from the following description of preferred embodiments, given by way of example only, which is made with reference to the accompanying drawings in which like reference numerals are used to denote like features.

FIG. 4 illustrates schematically transformation data according to embodiments; and FIG. 5 illustrates schematically transformation data for a resize operation according to embodiments.

DETAILED DESCRIPTION OF CERTAIN INVENTIVE EMBODIMENTS

Figure 1A:
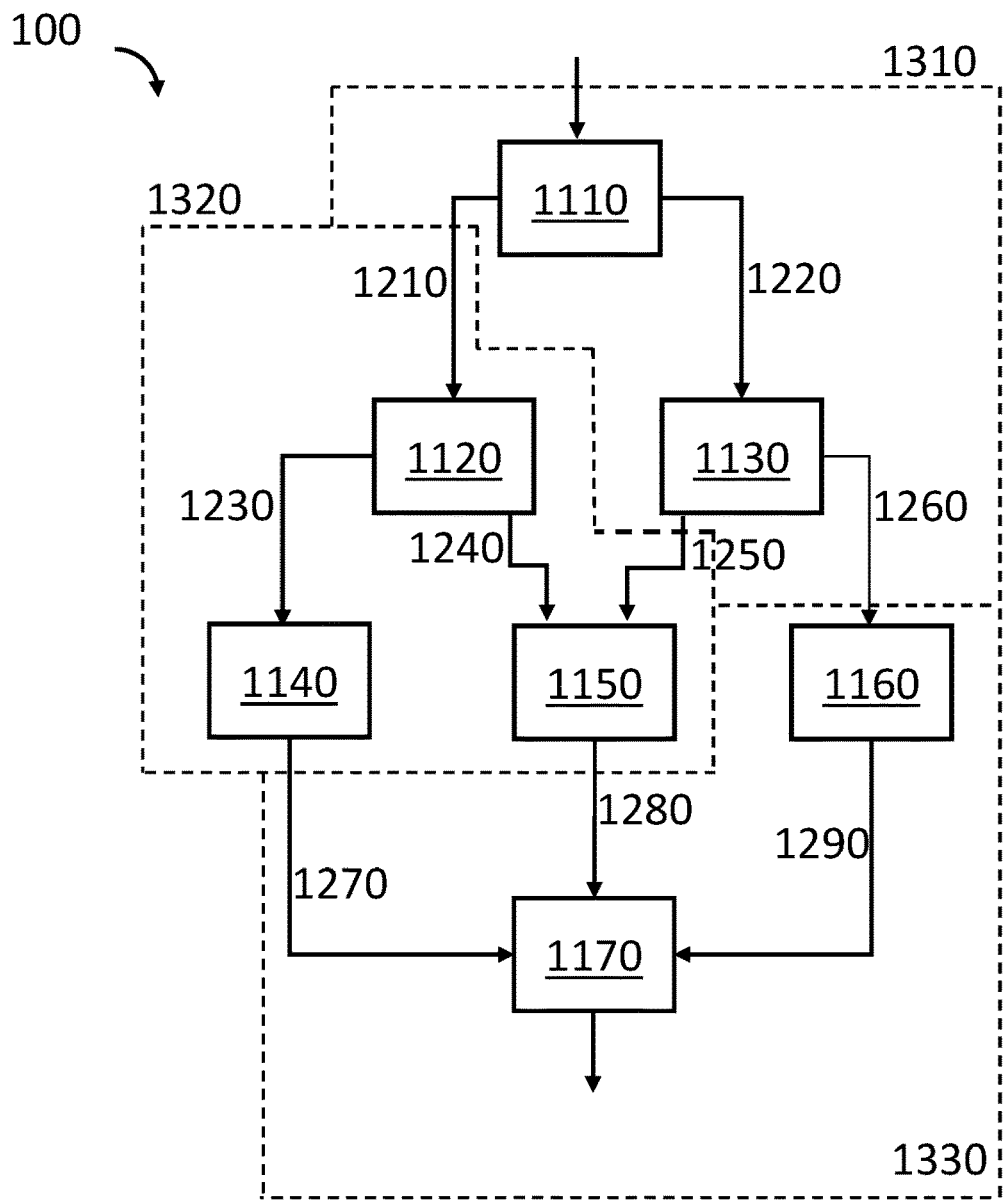
FIG. 1a illustrates an example directed acyclic graph in which sections are interconnected by a series of pipes according to the present disclosure.

This disclosure describes procedures, as well as methods, systems and computer-readable media for handling data in a processor.

A first aspect of the disclosure relates to a processor comprising a handling unit, a plurality of storage elements, and a plurality of execution units. The processor is configured to obtain, from storage, task data describing a task to be executed in the form of a plurality of operations on data, wherein each of the operations maps to a corresponding execution unit of the processor. The task data defines an operation space of said data and represents dimensions of a N-dimensional arrangement of the operations to be executed.

The operation space refers to a common operation space for operations to be executed by the executions units to execute the task. By defining such a common operation space, chaining of the functions needed to perform the task may be simplified and efficient coordination of the task by the handling unit may be achieved. By providing the capability to operate upon a sequence of connected operations (also referred herein as sections) that can be defined within an operation space common to the sequence of operations, it can be guaranteed that all coordinates required by the operations within the operation space are reachable when executing that sequence of operations. The data may represent at least part of a multi-dimensional tensor which is processed when executing the task. However, it is not necessary for each operation to be of the same type or nature. Consequently, an operation-specific local space may a different number of dimensions as long as the transformation required to go from the operation space to the operation-specific local space is "onto", i.e. all points in the integer operation-specific local space can be reached from the integer global operation space. Typically, the operation-specific local space has less dimension compared to the operation space but in some cases, the operation-specific local space has more dimensions compared to the operation space (such as for a ExpandDims operation where an extra dimension of size 1 may be inserted). Different operations may have an operation-specific local space with a different number of dimensions. For each execution of an operation (or portion of an operation), the operation space is thus transformed into a local section space for that operation. To achieve a transform from the operation space to the operation-specific local space, data (parameters) are needed that may vary per unit of work (block/bounding box) and relate to the operation-space iteration of dimensions: the operation-specific local space bounding box.

To reduce complexity, the handling unit is configured to, for each of a plurality of N dimensional portions (unit of work, block, bounding box, etc.) of the operation space: define transformation data comprising transformation instructions representing a transform of the N dimensional portion of the operation space to generate respective operation-specific local spaces for each of the plurality of the operations, wherein said transformation data comprising a data field corresponding to each of the N dimensions of the operation space. The transformation data may thus comprise a same number of data fields for defining the transformation between the multi-dimensional operation space and the operation-specific local space irrespectively of how many dimensions the operation-specific local space contains and how in how many dimensions being produced by the transformation instructions when transforming from the operation space to the operation-specific local space. For every operation, there may thus be a fixed function transform from their individual operations-specific local space to each of their input and output data (also referred herein as pipes); this may be different for multiple inputs/output.

Transformation instructions may in some embodiments comprise or result in transformation coefficients, e.g., achieving a transformation matrix. Transformation instructions may also be referred to transformation verbs or a stack of transformation elements. The transformation instructions may comprise divisors which is a scaling factor used to adjust the size of the coordinates in the operation-specific local space.

Some operations uses parameters that may be complex to calculate given the hardware constraints and processing speed required in for a processor, such as a neural engine. Implementing the calculation logic required to calculate these parameters in each execution unit may be costly. However, the handling unit may already contain such calculation logic, for example to define the transformation data needed to go from the operation space to the operation-specific local space, or for other reasons. To facilitate compartmentalization of functionality, the handling unit may be configured to, for at least one operation of the plurality of operations, upon transformation from the operation space to the operation-specific local space requiring transformation instructions producing M dimensions, wherein M<N, define one or more operation-specific arguments, and store said one or more operation-specific arguments in a data field of corresponding to a dimension not produced by the transformation instructions in the transformation data. A further advantage is that some bits are a saved since otherwise unused data fields in the transformation data may be used for such operation-specific arguments.

The handling unit may then dispatch, to each of a plurality of the execution units associated with operations for which transformed local spaces have been generated, invocation data including said transformation data. Advantageously, each execution unit only needs to understand their fixed-function transform from operation space to the operation-specific local space, without needing to understand the chain of any operations preceding or succeeding it. For example, it is possible to chain additional operations in front of or after a convolution operation and stitch a wider variety of operations together, provided that the conditions of a valid operation space exist. Since all execution units are iterating through the same operation-space in execution, blocks of data are aligned. For example, a first block from a memory read operation will be the first block into the data processing operation, and this will trickle through to the first block in the memory write operation. This is a simplification given that for some operations (reduction and broadcast operations) since the block may be grouped with data from other blocks to form a new merged block, but generally holds as a principle. Specific operations on data may be simplified using the operation-specific arguments provided to the execution unit in the transformation data.

In some examples, the handling unit comprises a datapath used to define the transformation data, wherein datapath instructions for defining the transformation data comprising transformation instructions producing M<N dimensions to transform to the operation-specific local space of an operation, using said data path. The datapath instructions may further specify functionality for defining said one or more operation-specific arguments.

A datapath is a fundamental component of a processor that is responsible for performing arithmetic and logic operations on data. It is the portion of the processor that carries out the instruction execution process. The datapath may include a number of functional units, such as the arithmetic logic unit (ALU), registers, multiplexers, and other components that enable the processing of data. The datapath may for example operate by receiving instructions from the processor's instruction register, and executing them using the functional units in the datapath.

Using the same datapath for both defining the transformation instructions needed for transforming from the operation space to the operation-specific local space as well as to define the one or more operation-specific arguments may result in a reuse of the pipeline in the processor, used to define the transformation data, to also be used for defining the one or more operation-specific arguments.

In some examples, the datapath instructions are programmatic and stored in storage accessible to the handling unit (such as the instruction register of the processor). The programmatic datapath instructions may be accessed by the handling unit when defining the transformation data for an operation. Consequently, the handling unit may execute the programmatic datapath instructions without necessary being aware of whether a particular data item the transformation data relates to transformation instructions to get to the operation-specific local space or an operation-specific argument. The instructions being programmatic effectively means that an execution unit specific program is stored in the instruction register and accessed by the handling unit when transformation data relating to the operation mapped to the execution unit is being defined.

In some examples, for an operation of the plurality of operations, the one or more operation-specific arguments varies over the plurality of N dimensional portions of the operation space. Consequently, such argument may need to be re-calculated for each portion, and thus advantageously compartmentalized at a central control unit (handling unit) of the processor.

In some examples, for an operation of the plurality of operations and for each of the plurality of N dimensional portions of the operation space, the one or more operation-specific arguments are based at least in part on the transformation instructions representing the transform of the N dimensional portion of the operation space to the operation-specific local space of the operation. An example may be a resize operation where input y/x coordinate and y/x remainder offset is calculated and being based on the transformation instruction representing the transform to the operation-specific local space of the resize operation. Advantageously, the transformation instructions required to get to the operation-specific local space may already have been calculated and thus readily available when needed to calculate the operation-specific arguments.

In some examples, for an operation of the plurality of operations, wherein transformation from the operation space to the operation-specific local space of said operation requiring transformation instructions producing less dimensions than the number of dimensions of the operation space, the execution unit mapped to the operation is configured to execute the operation on said data using the invocation data using the following process. For each N dimensional portion of the plurality of N dimensional portions of the operation space the execution unit uses the M data fields in the transformation data corresponding to the transformation instructions to control coordinates in said data corresponding to the N dimensional portion for at least one of a reading operation from the data and a writing operation to the data. The execution unit uses the one or more operation-specific arguments stored in one or more of the remaining data fields in the transformation data as further input to the operation on the data corresponding to the N dimensional portion, for example when calculating what value should be written to a certain index in the data. The execution unit thus are aware of how to use each data item (e.g., a discrete piece of information found in a data field), in the transformation data, which is different to the handling unit which for example just uses a datapath and instructions to define the transformation data and does not care about any differences in meaning between data items in the data fields of the transformation data.

In some embodiments, the task data describes a task to be executed in the form of a directed acyclic graph (DAG) of operations. In a DAG, nodes represent operations or computations (for example machine learning operations, such as matrix multiplication or convolution) and edges represent dependencies between them. The DAG is acyclic, which means that there are no cycles or loops in the graph. This may be an important property because it may ensure that the computation can be executed efficiently and without redundant computations. In other words, each node is executed only when all of its inputs are available, and once a node is executed, its output can be used as an input by other nodes. Given the data flow in a DAG, as well as the division of the operation space into a plurality of multi-dimensional portions, arguments may be precomputed before being needed at an execution unit (and even if the execution unit is currently busy executing another part of the task) which advantageously saves some cycles.

In some embodiments, each connection between operations in the acyclic graph maps to a corresponding storage element of the processor, and wherein the invocation data further describes at least one of a source storage element (source pipe) and a destination storage element (destination pipe) corresponding to a connection between the particular operation that the execution unit is to execute and a further adjacent operation in the acyclic graph to which the particular operation is connected.

Each operation (section) may thus be linked by corresponding pipes to form a directed acyclic graph of operations. For each operation, source and destination pipes can be defined and, under the control of a handling unit, the execution of sections can be issued by issuing invocation data that defines in the source and destination pipes for the operation. The execution of the graph of operation by respective execution units is therefore implicitly ordered by the dependencies on specific inputs to the operation. The result of this implicit ordering being a simplified orchestration of operations amongst the execution units of the processor. Put another way, sections and their directed acyclic relationship to each other can be determined by their pipe usage (e.g. their producers/consumers).

In some examples, the dispatch of invocation data for the particular operation is dependent upon the availability of the source storage element and the destination storage element. More specifically, it is to be ensured that there is sufficient availability in the destination pipe for a new block or buffer. Determining the availability of a source storage element may involve determining there is an appropriate block/buffer in the source pipe.

In some examples, the handling unit, plurality of storage elements, and plurality of execution units form part of a first neural engine within the processor; and wherein the processor comprises: a plurality of further neural engines each comprising a respective plurality of further storage elements, a plurality of further execution units, and a further handling unit; and a command processing unit configured to issue to one or more neural engines respective tasks for execution. Advantageously, the command processing unit may issue different tasks to different neural engines to further improve throughput. The processor may form a part of a GPU.

In a second aspect, there is provided a method for handling data in a processor comprising a handling unit, a plurality of storage elements, and a plurality of execution units, the method comprising: obtaining, from storage, task data describing a task to be executed in the form of a plurality of operations on data, wherein each of the operations maps to a corresponding execution unit of the processor, the task data further defining an operation space of said data, the operation space representing dimensions of a N-dimensional arrangement of the operations to be executed, wherein N>1; for each of a plurality of N dimensional portions of the operation space: defining transformation data comprising transformation instructions representing a transform of the N dimensional portion of the operation space to generate respective operation-specific local spaces for each of the plurality of the operations, wherein said transformation data comprising a data field corresponding to each of the N dimensions of the operation space; for at least one operation of the plurality of operations, upon transformation from the operation space to the operation-specific local space quiring transformation instructions producing M dimensions, wherein M<N, defining one or more operation-specific arguments, and storing said one or more operation-specific arguments in a data field of corresponding to a dimension not produced by the transformation instructions in the transformation data; dispatching, to each of a plurality of the execution units associated with operations for which transformed local spaces have been generated, invocation data including said transformation data.

The second aspect may generally have the same features and advantages as the first aspect.

In a third aspect, there is provided a non-transitory computer-readable storage medium comprising a set of computer-readable instructions stored thereon which, when executed by at least one processor comprising a handling unit, a plurality of storage elements, and a plurality of execution units, the instructions are arranged to cause the at least one processor to: obtaining, from storage, task data describing a task to be executed in the form of a plurality of operations on data, wherein each of the operations maps to a corresponding execution unit of the processor, the task data further defining an operation space of said data, the operation space representing dimensions of a N-dimensional arrangement of the operations to be executed, wherein N>1; for each of a plurality of N dimensional portions of the operation space: defining transformation data comprising transformation instructions representing a transform of the N dimensional portion of the operation space to generate respective operation-specific local spaces for each of the plurality of the operations, wherein said transformation data comprising a data field corresponding to each of the N dimensions of the operation space; for at least one operation of the plurality of operations, upon transformation from the operation space to the operation-specific local space requiring transformation instructions producing M dimensions, wherein M<N, defining one or more operation-specific arguments, and storing said one or more operation-specific arguments in a data field of corresponding to a dimension not produced by the transformation instructions in the transformation data; dispatching, to each of a plurality of the execution units associated with operations for which transformed local spaces have been generated, invocation data including said transformation data.

The third aspect may generally have the same features and advantages as the first aspect.

Aspects of the disclosure will now be described in conjunction with FIG. 1-5.

Execution of a Directed Acyclic Graph (DAG)

The present disclosure relates to execution of a task in the form of a plurality of operations on data. Many data structures to be executed in a processor can be expressed as a directed acyclic graph. Examples of such data structures include neural networks which can be represented as a directed acyclic graph of operations that wholly compose the operations required to execute a network (i.e. to executed the operations performed across the layers of a neural network). A directed acyclic graph is a data structure of operations (herein also referred to as 'sections') having directed connections therebetween that indicate a flow of operations such that those directed connections do not form a closed loop. The connections between operations (or sections) present in the graph of operations are also to referred herein as 'pipes'. An acyclic graph may contain any number of divergent and convergent branches.

FIG. 1a illustrates an example directed acyclic graph in which sections are interconnected by a series of pipes. Specifically, an initial section, section 1 (1110) represents a point in the acyclic graph at which an operation, operation A, is to be performed when executing the graph. The output of operation A at section 1, 1100, is connected to two further sections, section 2 (1120) and section 3 (1130) at which respective operations B and C are to be performed. The connection between section 1 (1110) and section 2 (1120) can be identified as a pipe with a unique identifier, pipe 1 (1210). The connection between section 1 (1110) and section 3 (1130) can be identified as a pipe with a different unique identifier, pipe 2 (1220). The output of section 1, which is the result of performing operation A on the input to section 1, can be provided to multiple subsequent sections in a branching manner.

More generally, sections in the acyclic graph may receive multiple inputs, each from a respective different section in the acyclic graph via a respective different pipe. For example, section 1150 in FIG. 1a receives a first set of input data via pipe 1240 from section 1120 and a second set of input data via pipe 1250. Depending on the nature of the operation performed in a particular section and the dependencies of subsequent operations on the output of the operation, any number of input and output pipes may be connected to a particular section in the acyclic graph.

The acyclic graph can be represented by a number of sub-graphs each containing a subset of the sections in the graph. FIG. 1a illustrates an arrangement where the graph 110 is broken down into three sub-graphs 1310, 1320, and 1330 which can be connected together to form the complete graph. For example, sub-graph 1310 contains sections 1110 and 1130 (as well as the corresponding pipe 1120), sub-graph 1320 contains sections 1120, 1140, and 1150 (as well as corresponding pipes 1230, 1240), and sub-graph 1330 contains sections 1160 and 1170.

The deconstruction of a graph 110 into sub-graphs is particularly useful when seeking to execute the graph since it would be possible to separately execute the sub-graphs which allows for parallelization of execution where there are no dependencies between sub-graphs. This can be particularly useful in a multi-processor environment where sub-graphs can be allocated for execution by different processors in the multi-processor environment. However, as shown in FIG. 1a sub-graph 1320 has a dependency on the execution of operation A and section 1110 and sub-graph 1330 has a dependency on sub-graph 1310. As such, execution of sub-graph 1330 may need to be stalled until sub-graph 1310 has been completed. It will therefore be appreciated that it is necessary to carefully select the appropriate sub-graph arrangement to maximize or improve the execution efficiency of the graph.

Operation Space and Operation-Specific Local Space

When executing chains of operations, for example structured in a directed acyclic graph, each section could represent a different operation. It is not necessary for each operation to be of the same type or nature. This is particularly the case where the graph of operations is used to represent the processing of a neural network. The machine learning software ecosystem allows for a diverse structure of neural networks that are applicable to many different problem spaces, and as such there is a very large possible set of operators from which a neural network can be composed. The inventors have recognized that the possible set of operations from which sections can be formed can be hard to manage when seeking to design hardware to enable the execution (also referred to as "acceleration") of these operations—particularly when chained together. For example, enabling fixed-function operation of each possible type of operation can result in inefficient hardware by requiring support for obscure or complex operations (sections).

In order to provide for a flexible traversal pattern when performing a task comprising operations on data, where the operations to be performed and the dimensions of the data may differ between different task, it may be advantageous to define a multi-dimensional operation space. Most operations on data in this context may be expressed as a nested for-loop with operations. For example, a 2D convolution operation on an input tensor may be expressed as a 7D loop of scalar operations. Consequently, defining a general operation space in a coordinate system having for example eight dimensions may provide a low complexity pattern for execution of any task comprising operations on data, instead of relying on fixed functions per task type, which may encompass a significant risk of missing necessary combinations of patterns. By defining a common operation space for a task in the form of a plurality of operations on data, it may be less complex to chain a plurality of operations to be executed on data to each other and coordinate execution of these operations.

For example, consider a 2D convolution operation which can be expressed as a multi-dimensional loop of scalar operations. These may need to be executed on input 2D input data having dimensions input X (IX) and input Y (IY):

- (input) Input channel (IC)—a dimension representing the input channels upon which the operation is to be performed (in the example of images this may be three channels each representing one of red, green, and blue input channels)
- (input) Kernel dimension X (KX)—a first dimension X of a 2D kernel;
- (input) Kernel dimension Y (KY)—a second dimension Y of a 2D kernel;
- (output) Output X (OX)—a first dimension of the output feature map for the convolution operation;
- (output) Output Y (OY)—a second dimension of the output feature map for the convolution operation;
- (output) Batch (N)—a batch dimension of the operation, where the operation is to be batched;
- (output) Output channel—a dimension representing the output channels to be produced for the 2D convolution operation.

In one proposed ordering, KY/KX can be consider the inner-most dimensions and N is the outer-most dimension.

For the 2D convolution operation example above, it is possible to express the operation to be performed as a "nested for-loop" of scalar operations as is illustrated in the pseudocode set out below. In practice, when executing this operation, it is necessary for a processor to execute the operation across each of these dimensions by performing a multiple-accumulate operation (MAC), the result of which is then written into an accumulator (e.g. an accumulator buffer in hardware). Having operated through all of these dimensions, the 2D convolution is completed and the contents of the accumulator therefore represents the result of the 2D convolution operation across the entire dimensionality of operation.

```
for (output channel)
    for (batch N)
        for (output Y)
            for (output X)
                for (input channel)
                    for (kernel Y)
                        for (kernel X)
                            MAC
                            write accumulator
```

In some examples, the operation space contains 8 dimensions (N=8). Eight dimensions in operation space may allow execution of all neural operations. In other examples, the number of dimensions is less or more. The processes and techniques described herein are not limited to any number of dimensions in operation space. The number of dimensions may differ based on the requirements of the processor and what tasks it is specified to execute.

Operation space dimensions does not have a specific interpretation until they are projected into space for a specific task. This space is referred to as operation-specific local space, or section space, herein. As described above, different operations having different types may be chained together by defining the common operation-space for the whole graph (or chain of operations), and then defining transforms from the operation-space to each operation's individual section-space. Operation-space is typically mapped to a specific operation's local space in the graph, with programmatic transforms provided for all other operations. As described herein, the transformation from operation space to section space (and therefore the management of compatibility and correct structuring of data between consecutive operations) is managed and issued centrally by a single handling unit based upon the dimensionality of a pre-defined operation space—e.g., by a descriptor that defines the operation space and the sections and pipes that form the graph.

In some examples, an operation's section space might be mapped to input and/or output. When considering the acylic graph data structure described above in respect of FIG. 1a, the operation performed in each section of the graph can be defined by the set of input and output transform matrices for that operation. The input and output matrices can then be applied to a block in operation space (e.g., a N dimensional portions of the operation space) to determine a range of values for the input and output of that operation. These determined ranges of values represent the operation-specific local space for that operation, which forms a local coordinate system on which that operation can be executed for that block of the operation space.

Hardware Implementation

As described above, a data structure in the form of a directed acyclic graph may comprise plural sequenced operations that are connected to one another for execution in a chain. Described below is an example hardware arrangement for executing chained operations for at least a portion of a directed acyclic graph as illustrated in FIG. 1a.

Figure 1B:
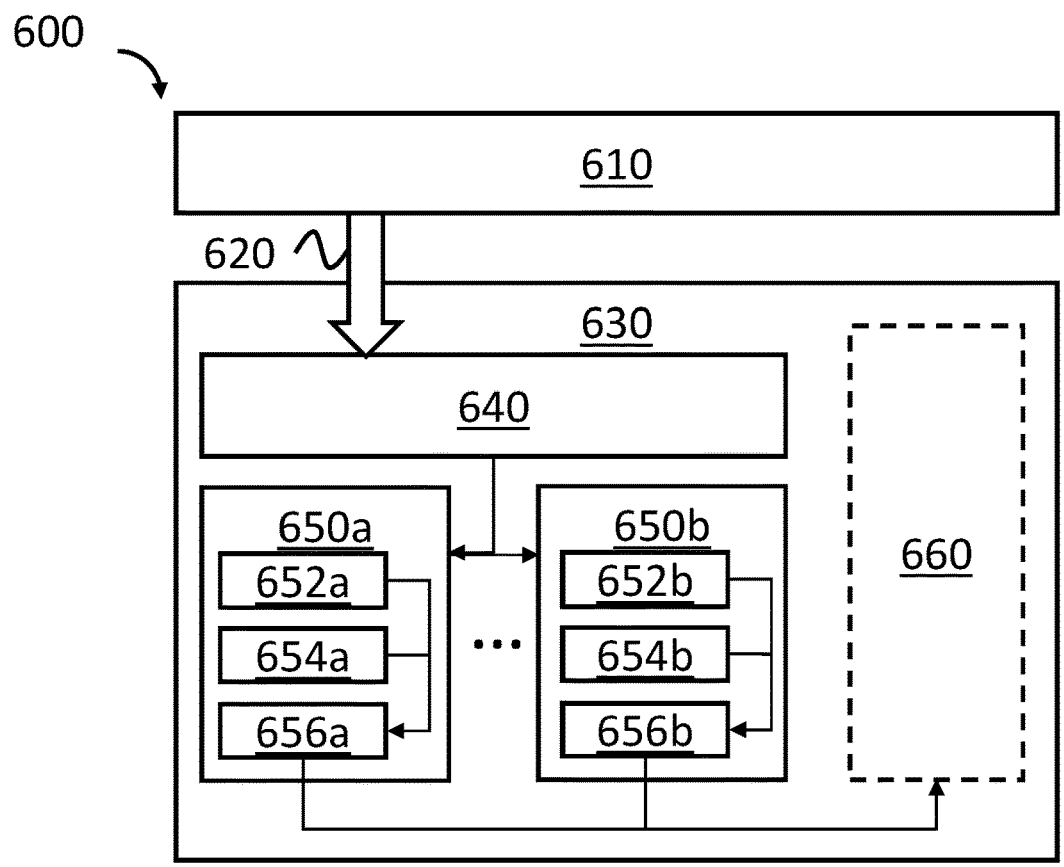
FIG. 1b illustrates schematically an example of a data processing system according to the present disclosure.

FIG. 1b shows schematically an example of a data processing system 600 including processor 630 which may act as a co-processor or hardware accelerator unit for a host processing unit 610. It will be appreciated that the types of hardware accelerator which the processor 630 may provide dedicated circuitry for is not limited to that of Neural Processing Units (NPUs) or Graphics Processing units (GPUs) but may be dedicated circuitry for any type of hardware accelerator. GPUs may be well-suited for performing certain types of arithmetic operations such as neural processing operations, as these operations are generally similar to the arithmetic operations that may be required when performing graphics processing work (but on different data formats or structures). Furthermore, GPUs typically support high levels of concurrent processing (e.g. supporting large numbers of execution threads), and are optimized for data-plane (rather than control plane) processing, all of which means that GPUs may be well-suited for performing other types of operations.

That is, rather than using entirely separate hardware accelerators, such as a machine learning processing unit that is independent of the graphics processor, such as an NPU, or only being able to perform machine learning processing operations entirely using the hardware of the GPU, dedicated circuitry may be incorporated into the GPU itself.

This means that the hardware accelerator circuitry incorporated into the GPU is operable, to utilize some of the GPU's existing resources (e.g. such that at least some functional units and resource of the GPU can effectively be shared between the different hardware accelerator circuitry, for instance), whilst still allowing an improved (more optimized) performance compared to performing all the processing with general purpose execution.

As such, the processor 630 may be a GPU that is adapted to comprise a number of dedicated hardware resources, such as those which will be described below.

In some examples, this can be particularly beneficial when performing machine learning tasks that themselves relate to graphics processing work, as in that case all of the associated processing can be (and preferably is) performed locally to the graphics processor, thus improving data locality, and (e.g.) reducing the need for external communication along the interconnect with other hardware units (e.g. an NPU). In that case, at least some of the machine learning processing work can be offloaded to the machine learning processing circuit, thereby freeing the execution unit to perform actual graphics processing operations, as desired.

In other words, in some examples, providing a machine learning processing circuit within the graphics processor, this means that the machine learning processing circuit is preferably then operable to perform at least some machine learning processing operations whilst the other functional units of the graphics processor are simultaneously performing graphics processing operations. In the situation where the machine learning processing relates to part of an overall graphics processing task this can therefore improve overall efficiency (in terms of energy efficiency, throughput, etc.) for the overall graphics processing task.

In FIG. 1b, the processor 630 is arranged to receive a command stream 620 from a host processor 610, such as a central processing unit (CPU). The command stream comprises at least one command in a given sequence, each command to be executed, and each command may be decomposed into a number of tasks, such as tasks discussed in this document. These tasks may be self-contained operations, such as a given machine learning operation or a graphics processing operation. It will be appreciated that there may be other types of tasks depending on the command.

The command stream 620 is sent by the host processor 610 and is received by a command processing unit 640 which is arranged to schedule the commands within the command stream 620 in accordance with their sequence. The command processing unit 640 is arranged to schedule the commands and decompose each command in the command stream 620 into at least one task. Once the command processing unit 640 has scheduled the commands in the command stream 620, and generated a plurality of tasks for the commands, the command processing unit issues each of the plurality of tasks to at least one compute unit 650a, 650b each of which are configured to process at least one of the plurality of tasks.

The processor 630 comprises a plurality of compute units 650a, 650b. Each compute unit 650a, 650b, may be a shader core of a GPU specifically configured to undertake a number of different types of operations, however it will be appreciated that other types of specifically configured processor may be used, such as a general-purpose processor configured with individual compute units, such as compute units 650a, 650b. Each compute unit 650a, 650b comprises a number of components, and at least a first processing module 652a, 652b for executing tasks of a first task type, and a second processing module 654a, 654b for executing tasks of a second task type, different from the first task type. In some examples, the first processing module 652a, 652b may be a processing module for processing neural processing operations, such as those which would normally be undertaken by a separate NPU. In these cases, the first processing module 652a. 652b is for example a neural engine. Similarly, the second processing module 654a, 654b may be a processing module for processing graphics processing operations forming a set of pre-defined graphics processing operations which enables the implementation of a graphics processing pipeline, which may be referred to as a graphics processor. For example, such graphics processing operations include a graphics compute shader task, a vertex shader task, a fragment shader takes, a tessellation shader task, and a geometry shader task. These graphics processing operations may all form part of a set of pre-defined operations as defined by an application programming interface, API. Examples of such APIs include Vulkan, Direct3D and Metal. Such tasks would normally be undertaken by a separate/external GPU. It will be appreciated that any number of other graphics processing operations may be capable of being processed by the second processing module.

As such, the command processing unit 640 issues tasks of a first task type to the first processing module 652a, 652b of a given compute unit 650a, 650b, and tasks of a second task type to the second processing module 654a, 354b of a given compute unit 650a, 650b. The command processing unit 640 would issue machine learning/neural processing tasks to the first processing module 652a, 652b of a given compute unit 650a, 650b where the first processing module 652a, 652b is optimized to process neural network processing tasks, for example by comprising an efficient means of handling a large number of multiply-accumulate operations. Similarly, the command processing unit 640 would issue graphics processing tasks to the second processing module 654a, 654b of a given compute unit 650a, 650b where the second processing module 652a, 654a is optimized to process such graphics processing tasks. In some examples, the first and second may both be neural processing tasks issued to a first processing module 652a, 652b, which is a neural engine. Such a neural processing task may involve the processing of a tensor, e.g. representing a feature map, with weights associated with a layer of a neural network.

In addition to comprising a first processing module 652a, 652b and a second processing module 654a, 654b, each compute unit 650a, 650b also comprises a memory in the form of a local cache 656a, 656b for use by the respective processing module 652a, 652b, 654a, 654b during the processing of tasks. Examples of such a local cache 656a, 656b is a L1 cache. The local cache 656a, 656b may, for example, a synchronous dynamic random-access memory (SDRAM). For example, the local cache 656a, 656b may comprise a double data rate synchronous dynamic random-access memory (DDR-SDRAM). It will be appreciated that the local cache 656a, 656b may comprise other types of memory.

The local cache 656a, 656b is used for storing data relating to the tasks which are being processed on a given compute unit 650a, 650b by the first processing module 652a, 652b and second processing module 654a, 654b. It may also be accessed by other processing modules (not shown) forming part of the compute unit 650a. 650b the local cache 656a, 656b is associated with. However, in some examples, it may be necessary to provide access data associated with a given task executing on a processing module of a given compute unit 650a. 650b to a task being executed on a processing module of another compute unit (not shown) of the processor 630. In such examples, the processor 630 may also comprise storage 660, for example a cache, such as an L2 cache, for providing access to data use for the processing of tasks being executed on different compute units 650a, 650b.

By providing a local cache 656a, 656b tasks which have been issued to the same compute unit 650a, 650b may access data stored in the local cache 656a, 656b, regardless of whether they form part of the same command in the command stream 620. The command processing unit 640 is responsible for allocating tasks of commands to given compute units 650a, 650b such that they can most efficiently use the available resources, such as the local cache 656a, 656b, thus reducing the number of read/write transactions required to memory external to the compute units 650a, 650b, such as the storage 660 (L2 cache) or higher level memories. One such example, is that a task of one command issued to a first processing module 652a of a given compute unit 650a, may store its output in the local cache 656a such that it is accessible by a second task of a different (or the same) command issued to a given processing module 652a, 654a of the same compute unit 650a.

One or more of the command processing unit 640, the compute units 650a, 650b, and the storage 660 may be interconnected using a bus. This allows data to be transferred between the various components. The bus may be or include any suitable interface or bus. For example, an ARM® Advanced Microcontroller Bus Architecture (AMBA®) interface, such as the Advanced extensible Interface (AXI), may be used.

Figure 2:
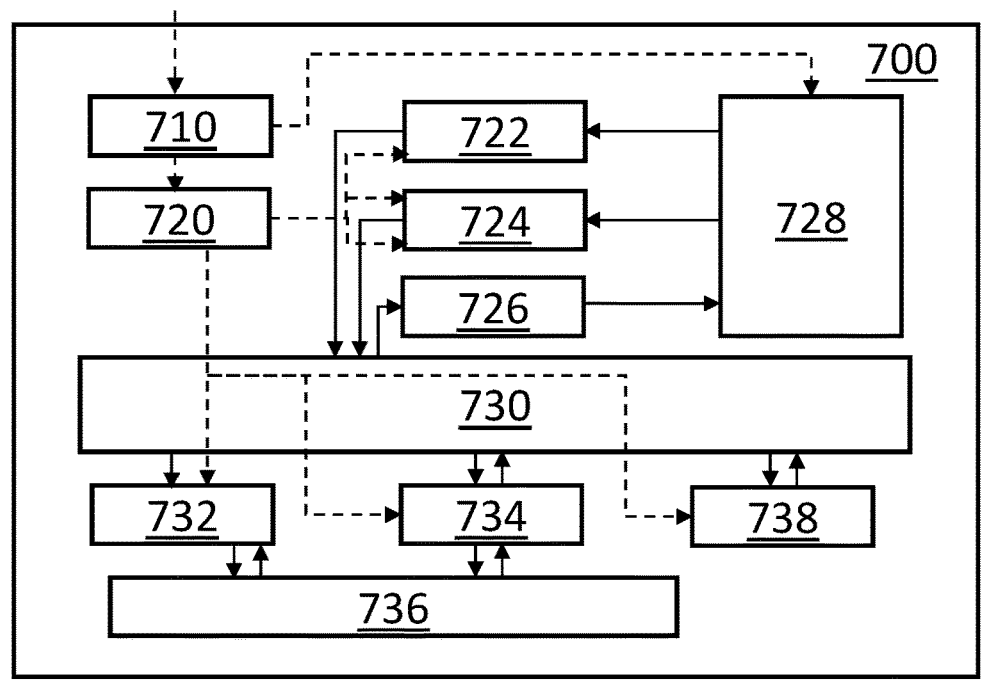
FIG. 2 illustrates a schematic diagram of a neural engine according to the present disclosure.

FIG. 2 is a schematic diagram of a neural engine 700, which in this example is used as a first processing module 652a, 652b in a data processing system 600 in accordance with FIG. 1b. The neural engine 700 includes a command and control module 710. The command and control module 710 receives tasks from the command processing unit 640 (shown in FIG. 1b), and also acts as an interface to storage external to the neural engine 700 (such as a local cache 656a, 656b and/or a L2 cache 660) which is arranged to store data to be processed by the neural engine 700 such as data representing a tensor, or data representing a stripe of a tensor. The external storage may additionally store other data to configure the neural engine 700 to perform particular processing and/or data to be used by the neural engine 700 to implement the processing such as neural network weights.

The command and control module 710 interfaces to a handling unit 720, which is for example a traversal synchronization unit (TSU). In this example, each task corresponds to a stripe of a tensor which is to be operated upon in accordance with a sequence of operations according to at least a portion (e.g. a sub-graph) of the acyclic graph representation of the neural network. The tensor for example represents a feature map for processing using the neural network. A neural network typically includes a sequence of layers of processing, with an output from each layer being used as an input to the next layer. Each layer for example processes an input feature map by operating upon the input feature map to generate an output feature map, which is used as the input feature map for the next layer. The term "feature map" is used generically herein to refer to either an input feature map or an output feature map. The processing performed by a given layer may be taken to correspond to an operation.

In this example, the handling unit 720 splits data representing a stripe of a feature map into a plurality of blocks of data, each of which represents a respective part of the feature map. The handling unit 720 also obtains, from storage external to the neural engine 700 such as the L2 cache 660, task data defining operations selected from an operation set comprising a plurality of operations. In this example, the operations are structured as a chain of operations representing a sequence of layers of the neural network. A block of data is allocated as an input to one of the operations by the handling unit 720.

The handling unit 720 coordinates the interaction of internal components (also referred to as execution units herein) of the neural engine 700, which include a weight fetch unit 722, an input reader 724, an output writer 726, a direct memory access (DMA) unit 728, a dot product unit (DPU) array 730, a vector engine 732, a transform unit 734, an accumulator buffer 736, and a storage 738, for processing of blocks of data. The data dependencies across the functional units are tracked by the handling unit 720. Processing is initiated by the handling unit 720 in a functional unit if all input blocks are available and space is available in the storage 738 of the neural engine 700. The storage 738 may be considered to be a shared buffer, in that various functional units of the neural engine 700 share access to the storage 738.

In the context of a directed acyclic graph representing the operations to be performed, each of the internal components that operates upon data can be considered to be one of two types of component. The first type of component is an execution unit (and is identified within the neural engine 700 as such) that maps to a section that performs a specific instance of an operation within the acyclic graph. For example, the weight fetch unit 722, input reader 724, output writer 726, dot product unit array 730, vector engine 732, transform unit 734 each are configured to perform one or more pre-determined and fixed operations upon data that it receives. Each of these sections can be uniquely identified with an identifier and each execution unit can also be uniquely identified.

Similarly, all physical storage elements within the neural engine (and in some instances portions of those physical storage elements) can be considered to be uniquely identified within the neural engine. The connections between sections in the acyclic graph representing the neural network are also referred to as pipes within the context of the acyclic graph. These pipes can also be mapped to the uniquely identified physical storage elements in the neural engine. For example, the accumulator buffer 736 and storage 738 (and portions thereof) can each be regarded as a storage element that can act to store data for a pipe within the acyclic graph. The pipes act as connections between the sections (as executed by execution units) to enable a sequence of operations as defined in the acyclic graph to be chained together within the neural engine 700. Put another way, the logical dataflow of the acyclic graph can be mapped to the physical arrangement of execution units and storage elements within the neural engine 700. Under the control of the handling unit 720, execution can be scheduled on the execution units and data can be passed between the execution units via the storage elements in accordance with the mapping, such that the chained operations of a graph can be executed without needing to write data memory external to the neural engine 700 between executions. The handling unit 720 is configured to control and dispatch work representing performing an operation of the graph on at least a portion of the data provided by a pipe.

The weight fetch unit 722 fetches weights associated with the neural network from external storage and stores the weights in the storage 738. The input reader 724 reads data to be processed by the neural engine 700 from external storage, such as a block of data representing part of a tensor. The output writer 726 writes data obtained after processing by the neural engine 700 to external storage. The weight fetch unit 722, input reader 724 and output writer 726 interface with the external storage (which is for example the local cache 656a, 656b, which may be a L1 cache such as a load/store cache) via the DMA unit 728.

Data is processed by the DPU array 730, vector engine 732 and transform unit 734 to generate output data corresponding to an operation in the acyclic graph. The result of each operation is stored in a specific pipe within the neural engine 700. The DPU array 730 is arranged to perform one or more operations associated with a dot product operation between two operands, such as between an array of weights and a corresponding block of data (e.g. representing part of a tensor). The vector engine 732 is arranged to perform elementwise operations, for example to apply scale parameters to scale an output of a dot product calculated by the DPU array 730. Data generated during the course of the processing performed by the DPU array 730 and the vector engine 732 may be transmitted for temporary stage in the accumulator buffer 736 which acts as a pipe between the previous operation and the subsequent operation, from where it may be retrieved by either the DPU array 730 or the vector engine 732 (or another different execution unit) for further processing as desired.

The transform unit 734 is arranged to perform in-block transforms such as dimension broadcasts or axis swaps. The transform unit 734 obtains data from a pipe, such as storage 738 (e.g. after processing by the DPU array 730 and/or vector engine 732), and writes transformed data back to the storage 738.

To make efficient use of the storage 738 available within the neural engine 700, the handling unit 720 determines an available portion of the storage 738, which is available during execution of part of a first task (e.g. during processing of a block of data associated with the first task by the DPU array 730, vector engine 732 and/or transform unit 734). The handling unit 720 determines a mapping between at least one logical address associated with data generated during execution of a second task (e.g. by processing of a block of data associated with the second task by the DPU array 730, vector engine 732 and/or transform unit 734) and at least one physical address of the storage 738 corresponding to the available portion. The logical address is for example a global address in a global coordinate system. Hence, by altering the physical address corresponding to a given logical address, the handling unit 720 can effectively control usage of the storage 738 without requiring a change in software defining the operation to be performed, as the same logical address can still be used to refer to a given element of the tensor to be processed. The handling unit 720 identifies the at least one physical address corresponding to the at least one logical address, based on the mapping, so that data associated with the logical address is stored in the available portion. The handling unit 720 can perform the mapping process according to any of the examples herein.

It will be appreciated that in a graph of operations there does not need to be only a single instance of a particular type of operation. For example, multiple instances of a convolution operation could be present in a graph of operations. In the above example hardware arrangement only a single convolution engine may be present. Therefore, it will be appreciated that there does not need to be a direct 1:1 mapping between operations in the graph (sections) and execution units, and similarly no direct 1:1 mapping between pipes and storage elements. In particular, a single execution unit may be configured at different instances in time to execute different instances of a convolution operation (e.g. first and second sections). Similarly, the input reader may be required to read data as part of different sections in the graph. The same can be said for storage elements and pipes.

All storage in the neural engine 700 may be mapped to corresponding pipes, including look-up tables, accumulators, etc. Some storage may be relatively fixed purpose, for example, if the hardware were limited to one convolution operation per graph the accumulator buffer might also be limited to being mapped to one pipe, and scale/bias/shift buffer might be limited to being mapped to one pipe; however both would likely be double buffered. If the neural engine supports 2 look-up tables (LUTs), then a maximum of 2 pipes could be used to target the LUTs to avoid needing to thrash the LUT storage; LUT pipes might then be single buffered. All other pipes could be mapped to a common Shared Buffer (or portions thereof) with fewer restrictions. Width and height of pipe can also be programmable, resulting a highly configurable mapping between pipes and storage elements within the neural engine 700.

Ordering of execution of the sections is implied by dependencies on inputs. A memory load operation has no data dependencies (unless it is a gather operation), so is implicitly early in the graph. The consumer of the pipe the memory read produces is implicitly after the memory read. A memory store operation is near the end of the graph, as it produces no pipes for other operations to consume. The sequence of execution of a chain of operations is therefore handled by the handling unit 720 as will be explained in more detail later.

Figure 3:
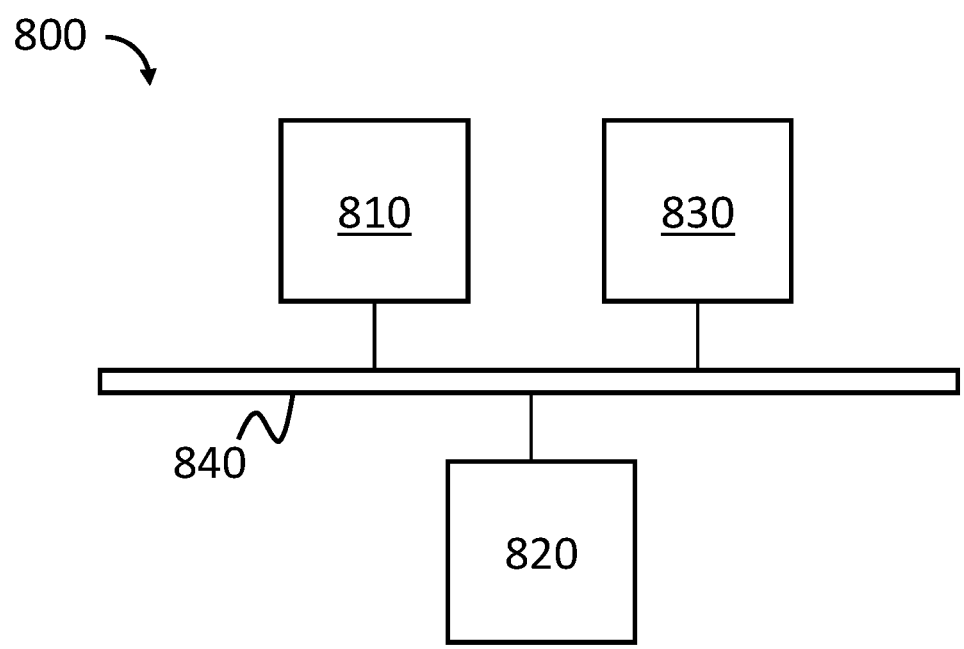
FIG. 3 illustrates schematically an example system for allocating handling data according to the present disclosure.

FIG. 3 shows schematically a system 800 for allocating handling data, and in some examples generating a plurality of blocks of input data for processing.

The system 800 comprises host processor 810 such as a central processing unit, or any other type of general processing unit. The host processor 810 issues a command stream comprising a plurality of commands, each having a plurality of tasks associated therewith.

The system 800 also comprises a processor 830, which may be similar to or the same as the processor 630 of FIG. 1b, and may comprise at least some of the components of and/or be configured to perform the methods described above. The processor 830 comprises at least a plurality of compute units 650a, 650b and a command processing unit 640. Each compute unit may comprise a plurality of processing modules each configured to perform at least one type of operation. The system 800 may also include at least one further processor (not shown), which may be the same as the processor 830. The processor 830, and the host processor 810 may be combined as a System on Chip (SoC) or onto multiple SoCs to form one or more application processors.

The system 800 also comprises memory 820 for storing data generated by the tasks externally from the processor 830, such that other tasks operating on other processors may readily access the data. However, it will be appreciated that the external memory usage will be used sparingly, due to the allocation of tasks as described above, such that tasks requiring the use of data generated by other tasks, or requiring the same data as other tasks, will be allocated to the same compute unit 650a. 650b of a processor 830 so as to maximize the usage of the local cache 656a, 656b.

In some examples, the system 800 may comprise a memory controller (not shown), which may be a dynamic memory controller (DMC). The memory controller is coupled to the memory 820. The memory controller is configured to manage the flow of data going to and from the memory. The memory may comprise a main memory, otherwise referred to as a 'primary memory'. The memory may be an external memory, in that the memory is external to the system 800. For example, the memory 820 may comprise 'off-chip' memory. The memory may have a greater storage capacity than local caches of the processor 830 and/or the host processor 810. In some examples, the memory 820 is comprised in the system 800. For example, the memory 820 may comprise 'on-chip' memory. The memory 820 may, for example, comprise a magnetic or optical disk and disk drive or a solid-state drive (SSD). In some examples, the memory 820 comprises a synchronous dynamic random-access memory (SDRAM). For example, the memory 820 may comprise a double data rate synchronous dynamic random-access memory (DDR-SDRAM).

One or more of the host processor 810, the processor 830, and the memory 820 may be interconnected using a system bus 840. This allows data to be transferred between the various components. The system bus 840 may be or include any suitable interface or bus. For example, an ARM® Advanced Microcontroller Bus Architecture (AMBA®) interface, such as the Advanced extensible Interface (AXI), may be used.

Task Data and Invocation Data

The processor, e.g., then neural engine 700, obtain, from storage, task data describing a task to be executed in the form of a plurality of operations on data, wherein each of the operations maps to a corresponding execution unit of the processor. In examples, the neural engine receives tasks from the command processing unit 640 to execute operations from the acyclic graph. The neural engine 700 is configured to execute operations selected from a base set of operations defining an operator set. One example of such an operator set is the Tensor Operator Set Architecture (TOSA) base inference profile, which defines a set of operations that can collectively be used to define the operations of a wide range of neural network operations. One exception to the TOSA operator set is control flow operations that may be implemented by way of a command stream processed by the command processing unit 640. It will be appreciated that there may be multiple neural engines with the processor 630 and thus multiple tasks can be issued concurrently to different neural engines.

In an example implementation, a task issued by the command processing unit 640 for execution by the neural engine 700 is described by task data which in this example is embodied by a neural engine program descriptor (NED), which is a data structure stored in memory and retrieved by the neural engine when executing the task issues by the command processing unit. The NED describes at least a portion of a complete graph of operations (sections) to be performed when executing the graph of operations (e.g., representing a neural network). As discussed above, sections are mapped to various hardware execution units within the neural engine 700 and essentially represent instantiations of a particular operator at a position within the graph (as exemplified in FIG. 1a). In one example, these sections are described by specific 'elements' that collectively define the operations forming part of the NED. An example NED comprises a NED structure comprising a header, the elements each corresponding to a section in the graph. The NED describes the various requirements of ordering, number and relationship of these sections and pipes.

The dataflow and dependencies of the task's graph is described by pipes. Pipes are used to represent data storage elements within the neural engine 700 and describe the relationship between sections (operations) in a producer-consumer relationship: the output destination pipe (e.g., a pipe number) and each input source pipe (e.g., a pipe number) for every section is defined in the NED elements of the NED. A pipe has only a single producer but may have multiple consumers. A pipe may be mapped to one of several different locations (e.g., storage elements in the neural engine 700), but not all locations may be suitable for the different section operations. It will be appreciated that, in some arrangements, a pipe may be mapped to only a portion of a storage element—e.g., a number of physical buffers, allowing it to describe double-buffering (for example) behavior between its producer and consumers. The output data generated by a section and stored in a pipe is referred to equivalently as both a block (of data) and a (virtual) buffer, with a block of data occupying one physical buffer location. Irrespective of location, pipes may be non-coherent with a wider memory system associated with the neural engine 700 and with processor 630, and data is stored out using the Output Writer element of the neural engine 700.

For a section to run, it must have all the appropriate buffers available for its input source pipes. A section may produce a new buffer in its output destination pipe and so there must be space available in the pipe for this new buffer. In the case of a reduction operation (convolution, for example), a section may repeatedly read back and update the previous buffer it generated. As a result, for a reduction operation there is a distinction between the reduction operation having first generated the output buffer and the reduction having completed and the output buffer being fully available, due to this update process. Put another way, there is a point in time at which the output buffer exists in the input pipe of a subsequent operation, but it is not yet ready to be consumed by the subsequent operation. The neural engine 700 is responsible for tracking all of these dependencies, in which buffers are tracked like FIFO entries, but with buffers only available for consumers when a producer has completed any sequence of reductions, and with buffers only freed up when all consumers have completed operations dependent on them.

Based on the received task data, the neural engine 700, and specifically the handling unit 720, is configured to define transformation data comprising transformation instructions that, for each of a plurality of portions of the operation space, is representing a transform of the N dimensional portion of the operation space to generate respective operation-specific local spaces for each of the plurality of the operations.

Operations such as the convolution operation described above can be separated into blocks (i.e, each of a plurality of N dimensional portions of the operation space), each block representing a subset of the dimensions of the operation. Breaking the operation into blocks involves separating the operation space of the operation into multiple blocks which each individually represent a portion of the operation but collectively represent the operation space. This block generation involves separating the operation space into sub-blocks representing a non-overlapping subset of the dimensions in the operation space which wholly cover the operation space dimensions (e.g., the set of nested for-loops shown above). In an example where the operation is to be separated into several blocks, the operation space is broken down into sub-blocks based upon a pre-determined block-size which defines for each dimension of the operation a fixed size.

For each such block, the handling unit 720 is thus configured to define transformation data comprising transformation instructions that represents a transform of the N dimensional portion of the operation space to generate respective operation-specific local spaces for each of the plurality of the operations (e.g., as exemplified in FIG. 1*a*). The transformation data may advantageously comprise a data field corresponding to each of the N dimensions of the operation space. FIG. 4 shows by way of example such transformation data 400. In this example, the operation space includes 8 dimensions 402, and for each of the 8 dimensions, a transform 404 into the operation-specific local space may be defined. The transform 404 is numbered 1-8 to indicate that it may be different transforms for each dimension. Each transform may depend on any of the dimensions d1-d8. In FIG. 4, for ease of description, the transformation data includes a description 406 for each dimension as well but this field is typically not included in the transformation data defined by the handling unit.

The transforms 404 may be calculated (defined, determined, etc.) using a datapath of the handling unit 720. The instructions to define the transform will be further described below, but generally, the instructions may be programmatic and the program for a specific operation may output data to be inserted in each of the N data fields 404. The handling unit 720 is using the datapath and the corresponding datapath instructions (e.g., being stored in storage accessible to the handling unit) to define the transformation data, but it is the programmatic instructions for a certain operation that defines which data that is inputted in the relevant data fields 404, 406.

As described above, for certain operations, an 8D operation-specific local space is not required. For example, a 2D Convolution operation only requires a 7D operation-specific local space, a transpose operation may only require a 4D operation-specific local space, a resize operation may also only require a 4D operation-specific local space, etc. Transformation from operation-space to operation-specific local-space may thus leave many unused dimensions. In other words, transformation from the operation space to the operation-specific local space requiring transformation instructions producing M dimensions, wherein M<N (N being the number of dimensions of the operation space, for example 8). Consequently, some of the data fields 404 defining the transform may in these cases be left unused.

Some of the operations may make use of one or more operation-specific arguments, typically quite complex to calculate, and varying over the plurality of N dimensional portions of the operation space. In some cases, these operation-specific arguments are based at least in part on the transform of the N dimensional portion of the operation space to the operation-specific local space of the operation.

The inventors have realized that the unused data fields in the transformation data in combination with the handling unit comprising a (generic) datapath used to calculate the transforms from the operation space to the operation-specific local space, can be used to handle the execution of the operation at hand more efficiently. Moreover, including dedicated hardware at each execution unit to calculate the operation-specific arguments may be avoided. Specifically, the handling unit may, using the instruction for the operation and the datapath, define one or more operation-specific arguments, and store said one or more operation-specific arguments in a data field corresponding to a dimension not produced by the transformation instructions in the transformation data.

Since the transformation data is defined by the handling unit, the calculations of the operation-specific arguments may be done in advance, and even while the execution unit is busy with execution of another operation or with the same operation but for another N dimensional portion of the operation space. Consequently, computational cycles may be spared, compared to waiting to the execution unit is free, and let the execution unit do the calculations of the one or more operation-specific argument before starting to execute the operation at hand.

FIG. 5 shows by way of example transformation data 400 for a vector engine resize operation. The resize operation scales a 4D tensor in dimensions 2 and 3 (y and x). Dimension 3 may for example be scaled up with a factor such that each step in x (e.g., x-coordinate in the input tensor) on the input corresponds to a scaled up step in x (e.g., x-coordinate in the output tensor) on the output. The table in FIG. 5 defines a section-space transform using a 4D operation specific local space (n=batch, oy=output y, ox=output x, c=channel). In FIG. 5, the first four data fields 502 in the transformation column corresponds to the transformation instructions required for the transform of the N dimensional portion of the operation space to generate the operation-specific local space for the resize operation. The next four data fields 504 in the transformation column instead define four operation-specific arguments, namely input Y, input Y remainder offset, input X and input X remainder offset.

To calculate for example the input Y argument, both additions, multiplications, floor-operation and clip-operation may be needed. Including such calculation logic in the resize execution unit may not be feasible considering the hardware constraints of a neural engine. It is thus advantageous to instead take advantage of the datapath of the handling unit to calculate the four operation-specific arguments 502, which thus saves both hardware resources as well as facilitate efficient handling of these calculations.

As shown in FIG. 5, the input Y argument and the input X argument depends directly on the transformation instructions 502 representing the transform of from the operation space to the operation-specific local space of the operation. Moreover, the input Y remainder offset argument and the input X remainder offset argument indirectly depends on the transformation instructions 502 representing the transform of from the operation space to the operation-specific local space of the operation.

Programmability of Operation Space to Section Space Transforms

As discussed above, the operation space for a task (subgraph) may contain a pre-determined number of dimensions (e.g., eight) but the local section space for the operation to be performed for a specific section in that graph can contain fewer than 8 dimensions. Also, as described above, the handling unit may iterate through the operation space in units known as blocks, transforming each block from the common operation-space to a section-specific space described by the various fields in the NED.

In an example implementation, the NED may further comprise for each element in the NED (e.g., each section/pipe) a program comprising transform program data that describes a transform from operation space to section space (local space) for the corresponding section. In other words, the datapath instructions used to define the transformation data (using the datapath) may be programmatic and stored in storage accessible to the handling unit 720, wherein the programmatic instructions are accessed by the handling unit 720 when defining the transformation data for an operation, for each of the plurality of N dimensional portions.

In one such implementation, each element in the NED may comprise an offset value that points to the specific program within the NED for executing the transform. This offset value may be regarded as a pointer into 'program space', being the space in which all the programs which define the various enabled transforms are located. Alternatively, the offset value may be a pointer into a virtual address space in main memory. For example, this program space can be defined in the NED as a field tsu_space_size which for example is sized as 256 bytes. The offset may point to a memory location at which the start of its section-space transform is placed (e.g., the first instruction in a sequence of instructions which collectively define a program for performing the transform).

Each transform program may end with an explicit END instruction and may be followed without any spacing or alignment by a next program defining a sequence of instructions for executing a different transform that is associated with a different element. Alternatively, a starting pointer may be used in conjunction with a total number of instructions to execute.

In an example implementation, the sequence of instructions used for each transform may be selected from a set of pre-determined instructions which effectively form an instruction set. This instruction may be regarded as a transform instruction set which may be a specific set of instructions selected optimally to perform transforms from operation space to section space. Alternatively, the transforms may be general purpose instruction set as seen in a central processing unit (CPU).

In an example implementation, a transform instruction may operate on a set of state values for the transform. The state values comprise boundary registers (in one example eight boundary registers b[0] to b[7]) each comprising a low and a high component. Each block in the operation space is defined by the values described in the low and high components of the eight boundary registers. These values indicate the upper and lower bounds (inclusive) for the coordinates in the block for that axis of the "bounding box" operation space.

In this example, no other state is available to the instructions which operate to transform the operation space to a local section space for a specific operation to be performed. All operations performed by the instructions therefore operate on the boundary registers, including intermediate calculations.

Some sequences of instructions will transform one dimension at a time, starting with dimension 1 (e.g. b[0]) and work iteratively inwards through the dimensions. In other more complex sequence of instructions, more complex transforms may need to jump around by modifying the destination register identifier explicitly e.g. by using a SETD instruction in the set of instructions.

An example of a transform program to be used to transform the output dimensions of a convolution operation are set out below using a register swap instruction with destination modifier D and dimension d:

```
program, 4 instructions, 4 bytes
(d=1) Register swap b[d], b[1]   //swap OC and N
(d=2) SWP.D b[d], b[2]   //swap OC and OY
(d=3) SWP.D b[d], b[3]   //swap OC and OX
END
```

This sequence of instructions represents the following affine transformation for the output dimensions of the convolution operation:

| OFM | OC | N | OY | OX | IC | KY | KX | Offset |
|-----|----|----|----|----|----|----|----|--------|
| N   |    | 1 |    |    |    |    |    |        |
| OY  |    |   | 1  |    |    |    |    |        |
| OX  |    |   |    | 1  |    |    |    |        |
| OC  | 1  |   |    |    |    |    |    |        |
|     |    |   |    |    |    |    |    | 1      |

The result of executing the transform program for a specific block defines a block in section space, ready to be used for the invocation of the specific hardware execution unit that is to execute the section. In the case of many types of operation to be performed by a hardware execution unit to execute a section, the execution unit does not use a full 8-dimension section space. The handling unit therefore defines an invocation structure/data (e.g., including the transformation data 400 in FIG. 4-5) for each unit that defines the relevant requirements for that operation. As described above, one or more operation-specific arguments may be stored in data fields corresponding to dimensions not produced by the transformation instructions in the transformation data.

Execution Unit

The execution units of the processor (for example, the weight fetch unit 722, input reader 724, output writer 726, dot product unit array 730, vector engine 732, transform unit 734 of FIG. 2) is configured to execute the operation to which it maps in the task data. Specifically, the execution unit is configured to execute the operation on said data using the invocation data, wherein for each multi-dimensional portion of the plurality of multi-dimensional portions of the operation space, the execution unit uses the M data fields 502 in the transformation data 400 corresponding to the transformation instructions to control coordinates in the tensor data (corresponding to the multi-dimensional portion that is currently executed) for at least one of a reading operation and a writing operation. The execution unit further uses the one or more operation-specific arguments stored in one or more of the remaining data fields 504 in the transformation data 400 as further input to the operation on the tensor data. The execution unit thus can separate the different data fields in the transformation data 400 and use them as intended.

Miscellaneous

In summary, the present disclosure relates to a processor, method and non-transitory computer-readable storage medium for handling data, by obtaining task data describing a task to be executed in the form of a plurality of operations on data, the task data further defining an operation space of said data, analysing each of the operations to define in transformation data comprising transformation instruction representing a transform into an associated operation-specific local spaces. In case transformation instructions to get to the operation-specific local space for an operation comprises are producing less dimensions compared to the operation space, store one or more operation-specific arguments are stored in a data field corresponding to an unused dimension not produced by the transformation instructions in the transformation data corresponding to the operation.

At least some aspects of the examples described herein comprise computer processes performed in processing systems or processors. However, in some examples, the disclosure also extends to computer programs, particularly computer programs on or in an apparatus, adapted for putting the disclosure into practice. The program may be in the form of non-transitory source code, object code, a code intermediate source and object code such as in partially compiled form, or in any other non-transitory form suitable for use in the implementation of processes according to the disclosure. The apparatus may be any entity or device capable of carrying the program. For example, the apparatus may comprise a storage medium, such as a solid-state drive (SSD) or other semiconductor-based RAM; a ROM, for example, a CD ROM or a semiconductor ROM; a magnetic recording medium, for example, a floppy disk or hard disk; optical memory devices in general; etc.

What is claimed is:

1. A processor for handling data, the processor comprising a handling unit, a plurality of storage elements, and a plurality of execution units, the processor configured to:
    obtain, from storage, task data describing a task to be executed in the form of a plurality of operations on data, wherein each of the operations maps to a corresponding execution unit of the processor, the task data further defining an operation space of said data, the operation space representing dimensions of a N-dimensional arrangement of the operations to be executed, wherein N>1;
    wherein the handling unit is configured to, for each of a plurality of N dimensional portions of the operation space:
    define transformation data comprising transformation instructions representing a transform of the N dimensional portion of the operation space to generate respective operation-specific local spaces for each of the plurality of the operations, wherein said transformation data comprising a data field corresponding to each of the N dimensions of the operation space;
    for at least one operation of the plurality of operations, upon transformation from the operation space to the operation-specific local space requiring transformation instructions producing M dimensions, wherein M<N, define one or more operation-specific arguments, and store said one or more operation-specific arguments in a data field corresponding to a dimension not produced by the transformation instructions in the transformation data;
    dispatch, to each of a plurality of the execution units associated with operations for which transformed local spaces have been generated, invocation data including said transformation data.

2. The processor of claim 1, wherein the handling unit comprises a datapath used to define the transformation data, wherein datapath instructions for defining the transformation data comprising transformation instructions producing M<N dimensions to transform to the operation-specific local space of an operation, using said datapath, wherein the datapath instructions further specifies functionality for defining said one or more operation-specific arguments.

3. The processor of claim 2, wherein the datapath instructions are programmatic and stored in storage accessible to the handling unit, wherein the programmatic datapath instructions are accessed by the handling unit when defining the transformation data for an operation, for each of the plurality of N dimensional portions.

4. The processor of claim 1, wherein, for an operation of the plurality of operations, the one or more operation-specific arguments varies over the plurality of N dimensional portions of the operation space.

5. The processor of claim 4, wherein, for an operation of the plurality of operations and for each of the plurality of N dimensional portions of the operation space, the one or more operation-specific arguments are based at least in part on the transformation instructions representing the transform of the N dimensional portion of the operation space to the operation-specific local space of the operation.

6. The processor of claim 1, wherein, for an operation of the plurality of operations, wherein transformation from the operation space to the operation-specific local space of said operation requiring transformation instructions producing M dimensions, wherein M<N, the execution unit mapped to the operation is configured to execute the operation on said data using the invocation data, wherein for each N dimensional portion of the plurality of N dimensional portions of the operation space:
    the execution unit uses the M data fields in the transformation data corresponding to the transformation instructions to control coordinates in said data corresponding to the N dimensional portion for at least one of a reading operation and a writing operation, and the execution unit uses the one or more operation-specific arguments stored in one or more of the remaining data fields in the transformation data as further input to the operation on the data corresponding to the N dimensional portion.

7. The processor of claim 1, wherein the task data describes a task to be executed in the form of a directed acyclic graph of operations.

8. The processor of claim 7, wherein each connection between operations in the acyclic graph maps to a corresponding storage element of the processor, and wherein the invocation data further describes at least one of a source storage element and a destination storage element corresponding to a connection between the particular operation that the execution unit is to execute and a further adjacent operation in the acyclic graph to which the particular operation is connected.

9. The processor of claim 8, wherein dispatch of invocation data for the particular operation is dependent upon the availability of the source storage element and the destination storage element.

10. The processor of claim 1, wherein the handling unit, plurality of storage elements, and plurality of execution units form part of a first neural engine within the processor; and wherein the processor comprises:
- a plurality of further neural engines each comprising a respective plurality of further storage elements, a plurality of further execution units, and a further handling unit; and
- a command processing unit configured to issue to one or more neural engines respective tasks for execution.

11. A method for handling data in a processor comprising a handling unit, a plurality of storage elements, and a plurality of execution units, the method comprising:
- obtaining, from storage, task data describing a task to be executed in the form of a plurality of operations on data, wherein each of the operations maps to a corresponding execution unit of the processor, the task data further defining an operation space of said data, the operation space representing dimensions of a N-dimensional arrangement of the operations to be executed, wherein N>1;
- for each of a plurality of N dimensional portions of the operation space:
- defining transformation data comprising transformation instructions representing a transform of the N dimensional portion of the operation space to generate respective operation-specific local spaces for each of the plurality of the operations, wherein said transformation data comprising a data field corresponding to each of the N dimensions of the operation space;
- for at least one operation of the plurality of operations, upon transformation from the operation space to the operation-specific local space requiring transformation instructions producing M dimensions, wherein M<N, defining one or more operation-specific arguments, and storing said one or more operation-specific arguments in a data field of corresponding to a dimension not produced by the transformation instructions in the transformation data;
- dispatching, to each of a plurality of the execution units associated with operations for which transformed local spaces have been generated, invocation data including said transformation data.

12. The method of claim 11, further comprising:
- defining the transformation data using a datapath of the handling unit, wherein datapath instructions for defining the transformation data comprising transformation instructions producing M<N dimensions to transform to the operation-specific local space of an operation, using said datapath, wherein the datapath instructions further specifies functionality for defining said one or more operation-specific arguments.

13. The method of claim 12, further comprising:
- for an operation and for each of the plurality of N dimensional portions, reading, by the handling unit, the datapath instructions from memory accessible by the handling unit, wherein the datapath instructions being programmatic.

14. The method of claim 11, wherein, for an operation of the plurality of operations, the one or more operation-specific arguments varies over the plurality of N dimensional portions of the operation space.

15. The method of claim 14, wherein, for an operation of the plurality of operations and for each of the plurality of N dimensional portions of the operation space, the one or more operation-specific arguments are based at least in part on the transformation instructions representing the transform of the N dimensional portion of the operation space to the operation-specific local space of the operation.

16. The method of claim 11, wherein, for an operation of the plurality of operations, wherein transformation from the operation space to the operation-specific local space of said operation requiring transformation instructions producing M dimensions, wherein M<N, the execution unit mapped to the operation is configured to execute the operation on said data using the invocation data, the method further comprising, for each N dimensional portion of the plurality of N dimensional portions of the operation space:
- using, by the execution unit, the M data fields in the transformation data corresponding to transformation instructions to control coordinates in said data corresponding to the N dimensional portion for at least one of an reading operation and a writing operation, and
- using, by the execution unit, the one or more operation-specific arguments stored in one or more of the remaining data fields in the transformation data as further input to the operation on the data corresponding to the N dimensional portion.

17. The method of claim 11, wherein the task data describes a task to be executed in the form of a directed acyclic graph of operations.

18. The method of claim 17, wherein each connection between operations in the acyclic graph maps to a corresponding storage element of the processor, and wherein the invocation data further describes at least one of a source storage element and a destination storage element corresponding to a connection between the particular operation that the execution unit is to execute and a further adjacent operation in the acyclic graph to which the particular operation is connected, the method further comprising,
- dispatching of invocation data for the particular operation upon the availability of the source storage element and the destination storage element.

19. A non-transitory computer-readable storage medium comprising a set of computer-readable instructions stored thereon which, when executed by at least one processor comprising a handling unit, a plurality of storage elements, and a plurality of execution units, the instructions are arranged to cause the at least one processor to:
- obtaining, from storage, task data describing a task to be executed in the form of a plurality of operations on data, wherein each of the operations maps to a corresponding execution unit of the processor, the task data further defining an operation space of said data, the operation space representing dimensions of a N-dimensional arrangement of the operations to be executed, wherein N>1;
- for each of a plurality of N dimensional portions of the operation space:

defining transformation data comprising transformation instructions representing a transform of the N dimensional portion of the operation space to generate respective operation-specific local spaces for each of the plurality of the operations, wherein said transformation data comprising a data field corresponding to each of the N dimensions of the operation space;

for at least one operation of the plurality of operations, upon transformation from the operation space to the operation-specific local space requiring transformation instructions producing M dimensions, wherein M<N, defining one or more operation-specific arguments, and storing said one or more operation-specific arguments in a data field of corresponding to a dimension not produced by the transformation instructions in the transformation data;

dispatching, to each of a plurality of the execution units associated with operations for which transformed local spaces have been generated, invocation data including said transformation data.

20. The non-transitory computer-readable storage medium of claim 19, wherein the set of computer-readable instructions stored thereon are arranged to:

defining the transformation data using a datapath of the handling unit, wherein datapath instructions for defining the transformation data comprising transformation instructions producing M<N dimensions to transform to the operation-specific local space of an operation, using said data path, wherein the datapath instructions further specifies functionality for defining said one or more operation-specific arguments.

* * * * *